Figure 4:
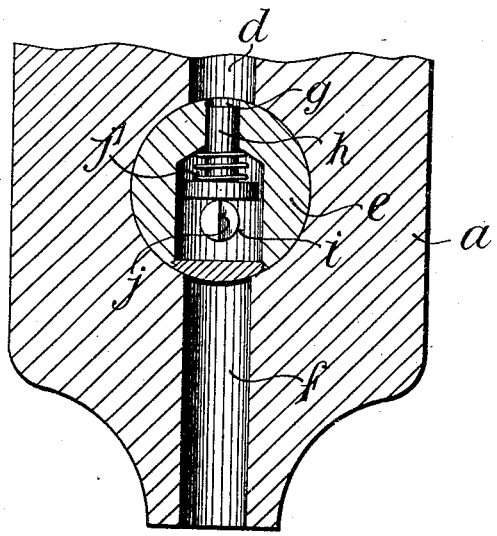

No. 774,326. PATENTED NOV. 8, 1904.
A. A. KELLY.
APPARATUS FOR DELIVERING MEASURED QUANTITIES.
APPLICATION FILED MAR. 3, 1904.
NO MODEL. 2 SHEETS—SHEET 1.
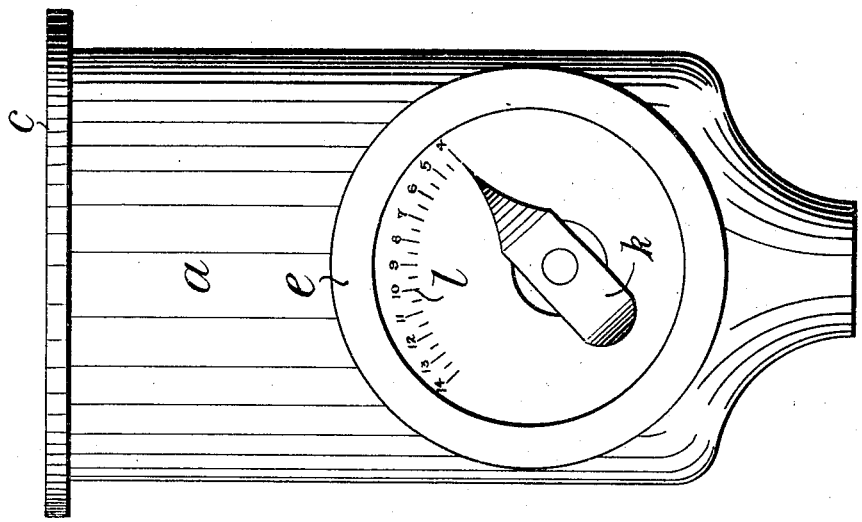
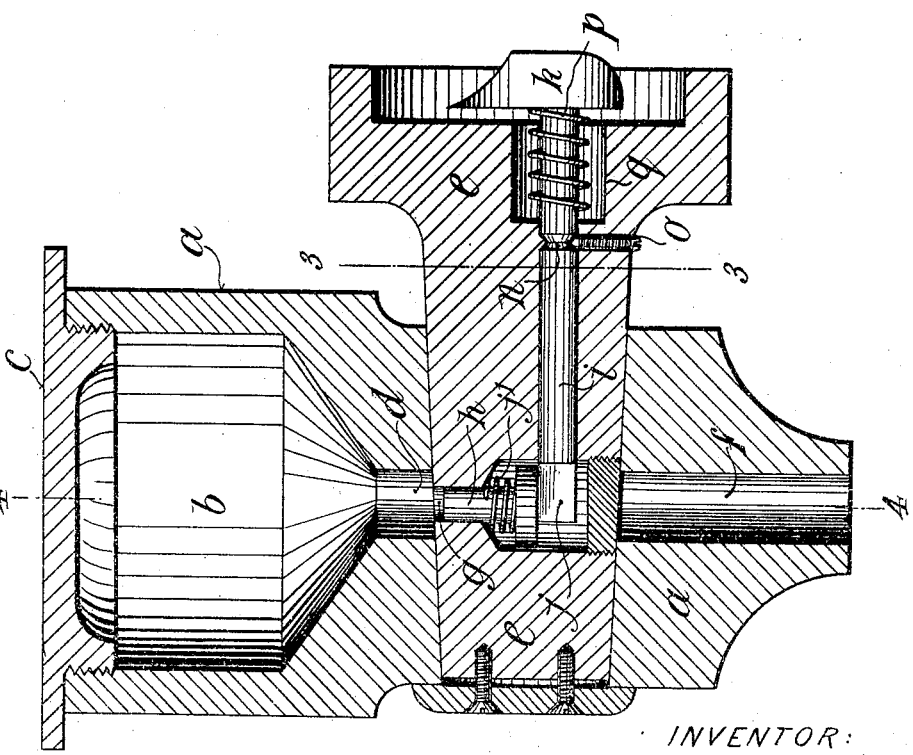
WITNESSES:
Fred White
Thomas Wallace
INVENTOR:
Albert Andrew Kelly,
By his Attorneys:
Arthur E. Fraser & Co.

No. 774,326. PATENTED NOV. 8, 1904.
A. A. KELLY.
APPARATUS FOR DELIVERING MEASURED QUANTITIES.
APPLICATION FILED MAR. 3, 1904.
NO MODEL. 2 SHEETS—SHEET 2.

WITNESSES: INVENTOR:
Fred White Albert Andrew Kelly,
Thomas F. Wallas By his Attorneys
Arthur E. Mayer & Co.

No. 774,326.

Patented November 8, 1904.

UNITED STATES PATENT OFFICE.

ALBERT ANDREW KELLY, OF SIDCUP, ENGLAND.

APPARATUS FOR DELIVERING MEASURED QUANTITIES.

SPECIFICATION forming part of Letters Patent No. 774,326, dated November 8, 1904.

Application filed March 3, 1904. Serial No. 196,447. (No model.)

*To all whom it may concern:*

Be it known that I, ALBERT ANDREW KELLY, experimental chemist, a subject of the King of Great Britain and Ireland, residing in Sidcup, in the county of Kent, England, have invented certain new and useful Improvements in Apparatus for Delivering Measured Quantities, of which the following is a specification.

This invention consists of improvements in apparatus for delivering measured quantities.

My improved apparatus has been designed more especially for the use of dentists and other persons who require to employ accurately-measured quantities of mercury and other liquid, granular, or pulverulent substances.

In the following description I will assume mercury to be the substance to be measured; but it will be understood that the apparatus can be employed for delivering measured quantities of other liquid or substances of the character referred to, if desired.

An apparatus for delivering measured quantities constructed according to my invention comprises a reservoir for the liquid or substance to be delivered and provided with a hole, hereinafter called the "filling-hole," for the passage of the material therefrom, a valve or plug disposed below said reservoir and formed with a hole or orifice, hereinafter called the "measuring-chamber," adapted to be brought by moving the valve or plug to one position into coincidence with said filling-hole to receive a quantity of material and by moving the valve or plug to another position into coincidence with a delivery passage or orifice for the discharge thereof. Within the said measuring-chamber works a measuring piston or plunger connected by suitable means with an indicator-hand or equivalent device in such manner that when said hand or device is moved or set to any given point on an indicating scale or dial the motion is transmitted to said measuring piston or plunger to correspondingly vary the capacity of the measuring-chamber, which is thus filled with a quantity of material corresponding to the point to which the indicator is moved. By then moving the plug to bring the measuring-chamber into register with the discharge-passage the measured quantity can be delivered.

The manner in which the invention may be carried into effect will be understood from the following description of one example of apparatus constructed in accordance therewith and designed more especially for use with mercury, reference being had to the accompanying drawings.

Figure 3:
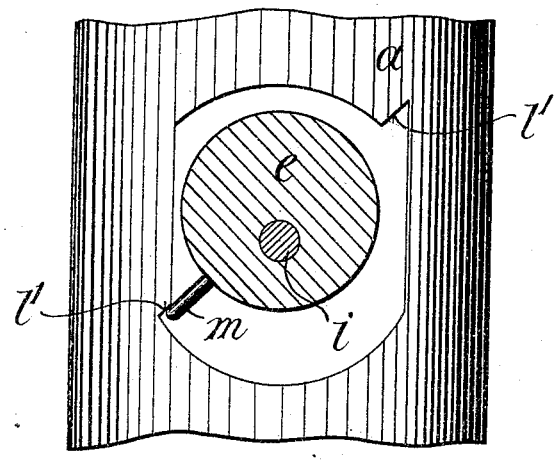

Figure 1 is a vertical mid-section longitudinally of the plug. Fig. 2 is a front elevation. Fig. 3 is a part-sectional front elevation showing the stops for arresting the rotation of the plug at the filling and delivering positions, respectively, being a section on the line 3 3, Fig. 1; and Fig. 4 is a section on line 4 4, Fig. 1.

The apparatus illustrated comprises a shell $a$, of vulcanite or other suitable material, formed or provided at its upper part with a reservoir $b$ for the mercury. Said reservoir may conveniently have a conical or rounded bottom, as shown, and may be provided with a screw or other cover $c$. A hole $d$ is formed in the bottom of the reservoir $b$, this hole opening into a transverse annular chamber formed in the shell of the apparatus, in which chamber is fitted a plug $e$, of vulcanite or other suitable material, adapted to be turned through an arc of one hundred and eighty degrees or to other suitable extent. This plug should be a good working fit in the annular chamber, and the annular chamber and plug may with advantage be formed with a slight taper, as shown. Below the said plug $e$ and preferably in line with the hole $d$ a discharge orifice or passage $f$ for the measured quantity of mercury is formed in the shell $a$.

A measuring-hole $g$ (the measuring-chamber before mentioned) is formed in the plug $e$ in such a position that it can be turned by rotating the plug into register with the filling-hole $d$ in the bottom of the reservoir and with the discharging-orifice $f$, as required. In the measuring-chamber $g$ works a piston or plunger $h$, hereinafter called the "measuring-plunger," adapted to be moved in the chamber $g$ to vary the capacity thereof under the action of a longitudinal spindle $i$, fitted in the plug through the medium of a suitable cam, flat face, or equivalent means $j$, provided on, or it may be connected to, the said spindle. In the drawings the spindle $i$ is shown as formed into a cam at its rear end with a flat face $j$ for this purpose. A spring $j''$ may be provided to insure good working contact between the measuring-plunger $h$ and the flat face $j$ or other device by which the motion of the spindle $i$ is communicated to said plunger. On the outer end of the spindle $i$ is fixed an indicator-hand $k$, adapted to be turned to any desired point of a graduated dial $l$, provided on the outer end of the plug $e$. The graduations of said dial correspond to the varying capacity of the measuring-chamber as determined by the rotation of the longitudinal spindle $i$, so that the act of turning the indicator $k$ to any point on the scale has the effect of moving the measuring-plunger $h$ to correspondingly vary the capacity of the measuring-chamber $g$.

The action is as follows: The spindle $i$ and indicator $k$ being set to the desired point on the dial, the operator turns the plug $e$ to obtain a charge of the material contained in the reservoir. The measuring-chamber $g$ is thus filled with the desired quantity. The plug is then turned to bring the measuring-chamber $g$ opposite the discharging-orifice $f$, through which the measured quantity is delivered. Any desired number of equal quantities can be delivered by simply turning the plug $e$ backward and forward into coincidence with the filling and discharging orifices $d$ and $f$ alternately, and all that is necessary to vary the quantity delivered is to set the indicator to the figure desired.

$l'$ $l'$, Fig. 3, are stop-shoulders adapted to coöperate with a pin $m$ on the plug to limit the rotation of the plug to the points at which the measuring-chamber $g$ coincides with the filling and discharging orifices, respectively.

I prefer to provide means to prevent endwise movement of the longitudinal spindle $i$ in the plug, and for this purpose I may form a circumferential groove $n$ in the said spindle for the reception of a fixing-screw $o$, passing through the wall of the plug. I prefer also to provide means for preventing the spindle $i$ and measuring-plunger $h$ from shifting accidentally when the plug is turned or from other accidental cause, and for this purpose I may provide a spiral spring $p$, embracing the spindle $i$, this spring being seated in a recess $q$ and bearing against the indicator-hand $k$ (or other convenient point) in such manner as to keep the circumferential groove $n$ in sufficient frictional contact with the fixing-screw to prevent accidental turning of the spindle $i$.

What I claim as my invention, and desire to secure by Letters Patent, is—

1. In apparatus for delivering measured quantities of liquids, granular, or pulverulent material, the combination of a container, a plug disposed in the base of the container and adapted to close an orifice of said container, a measuring-chamber in the plug adapted to be brought into communication with the container through the said orifice and to be cut off therefrom, a plunger disposed in the measuring-chamber, a spring adapted to retract the plunger so as to enlarge the capacity of the measure, a spindle in the plug, a cam actuated by the spindle and adapted to engage with the plunger so that when the spindle is turned the cam forces the plunger into the measuring-chamber so as to reduce the capacity of the measure, and means for moving the plug so as to close the connection between the measuring-chamber and the container and to bring the measuring-chamber into communication with a discharge-orifice in the base.

2. In apparatus for delivering measured quantities of liquids, granular, or pulverulent material, the combination of a container, a plug disposed in the base of the container and adapted to close an orifice of said container, a measuring-chamber in the plug adapted to be brought into communication with the container through the said orifice and to be cut off therefrom, a plunger disposed in the measuring-chamber, a spring adapted to retract the plunger so as to enlarge the capacity of the measure, a spindle in the plug, a cam actuated by the spindle and adapted to engage with the plunger so that when the spindle is turned the cam forces the plunger into the measuring-chamber so as to reduce the capacity of the measure, a pointer on the spindle, a scale over which the pointer will travel, said scale indicating the capacity of the measure, and means for moving the plug so as to close the connection between the measuring-chamber and the container and to bring the measuring-chamber into communication with a discharge-orifice in the base.

3. In apparatus for delivering measured quantities of liquids, granular or pulverulent material, the combination of a container, a plug disposed in the base of the container and adapted to close an orifice of said container, a measuring-chamber in the plug adapted to be brought into communication with the container through the said orifice and to be cut off therefrom, a plunger disposed in the measuring-chamber, means for regulating the position of the plunger in the measuring-chamber to alter the capacity of the measure, a pointer operated by said regulating means, a dial over which said pointer travels for indicating the capacity of the measure, and means for moving the plug so as to close the connection between the measuring-chamber and the container and to bring the measuring-chamber into communication with the discharge-orifice in the base.

4. In apparatus for delivering measured quantities of liquids, granular or pulverulent material, the combination of a container, a plug disposed in the base of the container and adapted to close an orifice of said container, a measuring-chamber in the plug adapted to be brought into communication with the container through the said orifice and to be cut off therefrom, a plunger disposed in the measuring-chamber, a spring adapted to retract the plunger so as to enlarge the capacity of the measure, a spindle in the plug, a cam actuated by the spindle and adapted to engage with the plunger so that when the spindle is turned the cam forces the plunger into the measuring-chamber so as to reduce the capacity of the measure, means for indicating the capacity of the measure and means for moving the plunger so as to close the connection between the measuring-chamber and the container and to bring the measuring-chamber into communication with a discharge-orifice in the base.

5. In apparatus for delivering measured quantities of liquids, granular, or pulverulent material, the combination of a container, a plug disposed in the base of the container and adapted to close an orifice of said container, a measuring-chamber in the plug adapted to be brought into communication with the container through the said orifice and to be cut off therefrom, a plunger disposed in the measuring-chamber, a spring adapted to retract the plunger so as to enlarge the capacity of the measure, a spindle in the plug, a cam actuated by the spindle and adapted to engage with the plunger so that when the spindle is turned the cam forces the plunger into the measuring-chamber so as to reduce the capacity of the measure, a pointer on the spindle, a scale over which the pointer will travel, said scale indicating the capacity of the measure, a friction device between the spindle and the plug, and means for moving the plug so as to close the connection between the measuring-chamber and the container and to bring the measuring-chamber into communication with a discharge-orifice in the base.

6. In apparatus for delivering measured quantities of liquids, granular, or pulverulent material, the combination of a container, a plug disposed in the base of the container and adapted to close an orifice of said container, a measuring-chamber in the plug adapted to be brought into communication with the container through the said orifice and to be cut off therefrom, a plunger disposed in the measuring-chamber, a spring adapted to retract the plunger so as to enlarge the capacity of the measure, a spindle in the plug, a cam actuated by the spindle and adapted to engage with the plunger so that when the spindle is turned the cam forces the plunger into the measuring-chamber so as to reduce the capacity of the measure, a pointer on the spindle, a scale over which the pointer will travel, said scale indicating the capacity of the measure, a spiral spring on the spindle and compressed between the pointer and the plug, a circular groove in the spindle, a stop in the plug engaging with the circular groove, and means for moving the plug so as to close the connection between the measuring-chamber and the container and to bring the measuring-chamber into communication with a discharge-orifice in the base.

In witness whereof I have hereunto signed my name in the presence of two subscribing witnesses.

ALBERT ANDREW KELLY.

Witnesses:
GORDON MELVILLE CLARK,
H. D. JAMESON.